US007309390B2

(12) United States Patent
Falkiewicz

(10) Patent No.: US 7,309,390 B2
(45) Date of Patent: Dec. 18, 2007

(54) STRIP-RESISTANT ASPHALT PAVING COMPOSITION AND METHOD FOR MAKING THE SAME

(75) Inventor: Michael Falkiewicz, St. Charles, MO (US)

(73) Assignee: ICL Performance Products LP, St. Louis, MO (US)

( * ) Notice: Subject to any disclaimer, the term of this patent is extended or adjusted under 35 U.S.C. 154(b) by 352 days.

(21) Appl. No.: 11/154,241

(22) Filed: Jun. 16, 2005

(65) Prior Publication Data

US 2005/0284333 A1 Dec. 29, 2005

Related U.S. Application Data

(60) Provisional application No. 60/582,118, filed on Jun. 23, 2004.

(51) Int. Cl.
*C09D 195/00* (2006.01)
(52) U.S. Cl. .............................. 106/284.04; 106/284.1
(58) Field of Classification Search .......... 106/284.04, 106/284.1
See application file for complete search history.

(56) References Cited

U.S. PATENT DOCUMENTS

| 2,383,097 | A | * | 8/1945 | Weetman .................... 106/278 |
|---|---|---|---|---|
| 2,450,756 | A | | 10/1948 | Hoiberg |
| 2,693,425 | A | | 11/1954 | Hardman |
| 3,751,278 | A | | 8/1973 | Alexander |
| 4,454,269 | A | | 6/1984 | Goodrich |
| 4,711,672 | A | * | 12/1987 | Gorter et al. ................ 106/274 |
| 4,721,529 | A | | 1/1988 | Mullins |
| 4,882,373 | A | | 11/1989 | Moran |
| 5,990,206 | A | * | 11/1999 | Tanaka et al. ................. 524/59 |
| 6,024,788 | A | * | 2/2000 | Tomioka et al. .......... 106/281.1 |
| 6,031,029 | A | | 2/2000 | Baumgardner et al. |
| 6,117,926 | A | | 9/2000 | Engber et al. |
| 6,228,909 | B1 | | 5/2001 | Baumgardner et al. |
| 6,399,680 | B1 | | 6/2002 | Engber et al. |
| 6,414,056 | B1 | | 7/2002 | Puzic et al. |
| 2002/0068776 | A1 | | 6/2002 | Guo et al. |

FOREIGN PATENT DOCUMENTS

EP 0792918 A2 9/1997

OTHER PUBLICATIONS

International Search Report, and Written Opinion Patent Cooperation Treaty, Sep. 23, 2005.

* cited by examiner

*Primary Examiner*—David M Brunsman
(74) *Attorney, Agent, or Firm*—Thompson Coburn LLP; Steven M. Ritchey, Esq.

(57) ABSTRACT

The present invention is directed to a stripping-resistant asphalt paving composition that contains asphalt, aggregate, polyphosphoric acid, and an alkaline anti-stripping additive.

20 Claims, No Drawings

STRIP-RESISTANT ASPHALT PAVING COMPOSITION AND METHOD FOR MAKING THE SAME

CROSS-REFERENCE TO RELATED APPLICATIONS

This application is claim priority to U.S. Provisional Patent Application No. 60/582,118, filed on Jun. 23, 2004, which is hereby incorporated by reference herein in its entirety.

BACKGROUND OF THE INVENTION

1. Field of the Invention

The present invention relates to asphalt pavement anti-stripping additives, and more particularly to the use of polyphosphoric acid in conjunction with an alkaline additive to improve the adhesion between an asphalt binder and aggregate.

2. Description of the Related Technology

As is well known, asphalt is commonly used as a paving material. Typically, the asphalt, often referred to as "asphalt cement" or "asphalt binder," is mixed with an aggregate to form an asphalt concrete suitable for paving. Thus, the asphalt concrete comprises aggregate held within a continuous phase of the asphalt binder by adherence of the asphalt binder to the aggregate. Unfortunately, however, asphalt binder has a tendency to lose its adhesive bond with the aggregate, particularly in the presence of moisture, in a process known as "stripping." Specifically, the adhesion between polar molecules within the asphalt and polar molecules on the aggregate surface is disrupted by water (a polar molecule) from rain or underground sources. The stripping of asphalt binder from aggregate surfaces reduces the life of the pavement and is a serious problem throughout the many millions of miles of highways throughout the world. In addition to stripping, water acts like a solvent in asphalt thereby decreasing asphalt viscosity, reducing strength, and increasing rutting.

In view of the foregoing, numerous efforts have been made over the years to reduce asphalt stripping. Many such efforts have been directed to including various additives to the asphalt binder compositions or even to the aggregate to increase the binder-aggregate adhesion. A typical type of anti-stripping additive comprises surface-active agents such as amines, preferably liquids, that have polar head-groups that exhibit an affinity for polar surfaces like that of the aggregate. The amines also typically contain long, non-polar fatty chains that exhibit a high affinity for asphalt binder. The molecular structure of a surface-active amine also tends to lower the interfacial tension between the asphalt binder and the aggregate, thereby increasing the strength of the adhesive bond between the two. Examples of such polyamines include AD-HERE HP PLUS (a trade designation of Arr-Maz Custom Chemicals, Inc. of Winter Haven, Fla., USA) and PAVE-BOND LITE (a trade designation of Rohm and Haas). Such anti-strips are usually mixed with the asphalt binder prior to pumping the modified binder to the mixing plant.

Alternatively, the modification of asphalt binders with polyphosphoric acid has been known for quite some time (see, e.g., U.S. Pat. No. 3,751,278), although its benefits as an anti-stripping additive may not have been recognized until more recently. Polyphosphoric acids may be reacted with asphalt to increase the asphaltene fraction or asphaltene dispersion of the binder. This change is the believed to be the primary reason for a change in the temperature-viscosity relationships of the asphalt binder. Specifically, at elevated temperatures, a binder comprising polyphosphoric acid tends to have a higher viscosity than the same binder without polyphosphoric acid. Conversely, at lower temperatures, a binder comprising polyphosphoric acid tends to have a low viscosity that the same binder without polyphosphoric acid. A secondary reason for the increase of the high temperature viscosity is believed to be hydrogen bonding between un-reacted acid (free acid sites) and the asphalt. Some studies indicate that the hydrogen bonding may be at least partially neutralized or reversed by the presence of conventional amine anti-strips, and as a result, there is a belief by some of those skilled in the art that polyphosphoric acid and amine anti-strips should not be used together.

A further alternative for improving adhesion is the use of hydrated lime (often simply referred to as "lime") in paving compositions. Typically, lime is added to the paving composition by treating the aggregate. The use of lime in asphalt paving has been known for at least 80 years, but its benefits as an anti-stripping additive was not known until more recently. Specifically, it is believed by those of skill in the art that lime reacts with highly polar molecules to form insoluble salts that tend not to attract water. This prevents said polar molecules from reacting with other molecules in the paving composition to form water-soluble soaps that promote stripping (see, e.g., Petersen, J. C., H. Plancher, and P. M. Harnsbergen, "Lime Treatment of Asphalt to Reduce Age Hardening and Improve Flow Properties," Proceedings, AAPT, Vol. 56, 1987).

An additional method of improving adhesion by treating the aggregate includes applying polymer coatings to the particles (see, e.g., U.S. Pat. Nos. 5,219,901 and 6,093,494). Specifically, U.S. Pat. No. 5,219,901 discloses a technique for reducing stripping tendencies that involves coating the aggregate with a thin, continuous film of a water-insoluble high molecular weight organic polymer, such as an acrylic polymer or a styrene-acrylic polymer.

Although many of the foregoing methods of improving stripping resistance have been effective to various degrees depending on numerous factors such as the type of asphalt, type of aggregate, amount of additive, etc., a need continues to exist for an asphalt concrete or paving composition having increased adherence or anti-stripping behavior in addition to other qualities that make it a desirable paving material (e.g., cost, ease of use, resistance to rutting, cracking, fatigue, oxidation and aging, etc.).

BRIEF SUMMARY OF THE INVENTION

Briefly, therefore, the present invention is directed to a novel paving composition comprising an asphalt paving composition comprising an asphalt binder, aggregate, and an alkaline anti-stripping additive, wherein the asphalt binder comprises asphalt and polyphosphoric acid.

The present invention is also directed to an asphalt paving composition consisting essentially of asphalt, aggregate, polyphosphoric acid, and an alkaline anti-stripping additive.

Additionally, the present invention is directed to an asphalt pavement comprising a compacted asphalt paving composition that comprises an asphalt binder, aggregate, and an alkaline anti-stripping additive, wherein the asphalt binder comprises asphalt and polyphosphoric acid.

Further, the present invention is directed to a method for improving the resistance to stripping of an asphalt pavement prepared using an asphalt paving composition that comprises asphalt and aggregate, the method comprising modifying the asphalt paving composition by adding polyphosphoric acid and an alkaline anti-stripping additive to the asphalt paving composition.

The present invention is also directed to a method for preparing an asphalt paving composition, the method comprising mixing a modified asphalt binder that comprises an asphalt and polyphosphoric acid with aggregate and an alkaline anti-stripping additive to produce the asphalt paving composition.

Additionally, the present invention is directed to a method of paving a surface with an asphalt paving composition, the method comprising depositing the asphalt paving composition onto the surface and compacting the deposited asphalt paving composition, wherein the asphalt paving composition comprises asphalt, aggregate, polyphosphoric acid, and an alkaline anti-stripping additive.

DETAILED DESCRIPTION OF THE INVENTION

In accordance with the present invention, it has been discovered that, surprisingly, the addition of polyphosphoric acid and an alkaline anti-stripping agent (e.g., lime) in an asphalt paving composition substantially increases the resistance to stripping of the paving composition. Thus, in one embodiment, the present invention is directed to an asphalt paving composition that comprises an asphalt, aggregate, polyphosphoric acid, and an alkaline anti-stripping agent. Typically, the asphalt paving composition of the present invention may be formed by mixing a modified asphalt binder and an aggregate mixture, wherein the asphalt binder comprises asphalt modified with polyphosphoric acid and the aggregate mixture comprises aggregate treated with an alkaline anti-stripping agent (e.g., lime). It is possible, however, to add the lime to the paving composition after the mixing of the aggregate and asphalt binder have begun (e.g., by injecting hydrated lime into a drum mixer just after the asphalt binder is injected).

A. Asphalt

Asphalt is defined by the ASTM as a dark brown to black cementitious material in which the predominant constituents are bitumens that occur in nature or are obtained in petroleum processing. Asphalts characteristically contain very high molecular weight hydrocarbons called asphaltenes. These are essentially soluble in carbon disulfide, and aromatic and chlorinated hydrocarbons. Bitumen is a generic term defined by the ASTM as a class of black or dark-colored cementitious substances, natural or manufactured, composed principally of high molecular weight hydrocarbons, of which asphalts, tars, pitches and asphaltenes are typical. The ASTM further classifies asphalts or bituminous materials as solids, semi-solids, or liquids using a penetration test for consistency or viscosity. In this classification, solid materials are those having a penetration of not more than 1 millimeter when a load of 100 grams is applied for 5 seconds while at 25° C. and semi-solids are those having a penetration of more than 1 millimeter when a load of 50 grams is applied for 5 seconds while at 25° C. Semi-solid and liquid asphalts predominate in commercial practice today.

Asphalt has viscous properties, which allow it to flow, and elastic properties, which resist flow. At elevated temperatures, the viscous properties dominate and the asphalt tends to flow or deform. At lower temperatures, the elastic properties dominate and the asphalt tends to resist flow. All types of asphalt, both naturally occurring and synthetically manufactured, are suitable for use in his invention. Naturally occurring asphalt is inclusive of native rock asphalt, lake asphalt, etc. Synthetically manufacture asphalt is often a by-product of petroleum refining operations and includes air-blown asphalt, blended asphalt, cracked or residual asphalt, petroleum asphalt, propane asphalt, straight-run asphalt, thermal asphalt, etc. Examples of asphalt, which are often referred to by their extraction location, include Wyoming Sour, Saudi Heavy, West Texas intermediate, California Valley, Venezuelan, and Canadian.

Asphalt chemistry can be described on the molecular level as well as on the intermolecular (microstructural) level. On the molecular level, asphalt is a mixture of complex organic molecules that range in molecular weight from several hundred to several thousand. Although these molecules affect behavioral characteristics of the asphalt, the behavior of asphalt is largely determined by the microstructure of the asphalt, which is that of a dispersed polar fluid. Specifically, a continuous three-dimensional association of polar molecules (asphaltenes) dispersed in a fluid of non-polar or relatively low-polarity molecules (maltenes). All these molecules are capable of forming dipolar intermolecular bonds of varying strength. Since these intermolecular bonds are weaker than the bonds that hold the basic organic hydrocarbon constituents of asphalt together, they will break first and control the behavioral characteristics of asphalt. Therefore, asphalt's physical characteristics are a direct result of the forming, breaking, and reforming of these intermolecular bonds or other properties associated with molecular superstructures. The result is a material that behaves elastically through the effects of the polar molecule networks and viscously because the various parts of the polar molecule network can move relative to one another due to the dispersion in the fluid non-polar molecules.

Asphalt binders are most commonly characterized by the physical properties that indicate how they perform as a constituent in a paving composition or hot mixed asphalt. Examples of relevant physical properties include durability and rheology, and some tests for evaluating different aspects of these properties include: thin-film oven test (AASHTO 179 and ASTM D 1754), rolling thin-film oven test (AASHTO T 240 and ASTM D 2872), pressure aging vessel test (AASHTO PP1), penetration test (AASHTO T 49 and ASTM D 4), softening point test (AASHTO T 53 and ASTM D 36), absolute viscosity at 60° C. test (AASHTO T 202 and ASTM D 2171), kinematic viscosity at 135° C. test (AASHTO T 201 and ASTM D 2170), ductility test (AASHTO T 51 and ASTM D113), rotational viscometer test (AASHTO TP 48 and ASTM D 4402), dynamic shear rheometer (AASHTO TP 5), bending beam rheometer (AASHTO TP1), and the direct tension test (AASHTO TP 3).

Rather than refer to an extensive list of physical properties, those in the art typically categorize asphalt binders by one or more grading systems such as the penetration grading system, the viscosity grading system, and the Superpave performance grading system. Penetration grades are listed as a range of penetration units determined according to AASHTO M 20 and ASTM D 946. The 40-50 grade is the hardest grade, the 60-70, 85-100, and 120-150 grades are typically used in the U.S., and the 200-300 grade is the softest grade and is typically used for cold climates such as northern Canada. Viscosity grading is performed on as-supplied asphalt binder (AC grading) or on aged residue samples (AR grading) according to AASHTO M 226 and ASTM D 3381. Typical grades for hot mixed asphalt in the U.S. are AC-10, AC-20, AC-30, AR-4000, and AR 8000.

The more recently developed Superpave performance grade (PG) is generally considered to more accurately and fully characterize asphalt binders for use in hot mixed asphalt pavements. Superpave performance grading is based on the idea that an asphalt binder's properties should be related to the conditions under which it is used. Therefore, the Superpave system uses several tests that are performed according to AASHTO PP6 at temperatures that depend on the relevant climate conditions. The Superpave performance grading is reported using two numbers—the first being the average seven-day maximum pavement temperature (° C) and the second being the minimum pavement design temperature to be experience (° C). Thus, a PG 58-22 is intended for use where the average seven-day maximum pavement temperature is 58° C. and the expected minimum pavement temperature is −22° C. Asphalt binders that are typically used in the U.S. have an average seven-day maximum pavement temperature that is within the range of about 50 and about 80° C. and an expected minimum pavement temperature that is within the range of about 10 and about 40° C. It is to be noted that as a general rule, PG binders that differ in the high and low temperature specification by 90° C. or more are typically the result of some sort of modification in order to improve certain characteristics such as resistance to high temperature thermal deformation ("creep" or "rutting"), low temperature cracking, or both.

As mentioned above, the paving composition of the present invention is not limited to any particular asphalt binder or combination of binders. Although any asphalt binder may be used, it is preferred that the paving composition comprises an asphalt binder or combination of binders having physical properties suitable for the particular application. The selection of such an asphalt binder or combination of binders is well known to those of skill in the art. Examples of commercially available asphalt binders that may be suitable for preparing a paving composition of the present invention include CONOCO AC-30, DIAMOND SHAMROCK AC-30, SHELL AR-4000, AMOCO 64-22, CITGO AC-30, CITGO PG 67-22, VALERO PG 64-22, and HUSKY 85/100.

B. Polyphosphoric Acid

A polyphosphoric acid is a series of oxyacids of phosphorous having the general chemical formula $H_{n+2}(P_nO_{3n+1})$. More specifically, polyphosphoric acids occur in the $P_2O_5$—$H_2O$ system and have a $P_2O_5$ content that is above about 74 percent. Polyphosphoric acids are complex mixtures of ortho- (n=1), pyro- (n=2), tri- (n=3), tetra (n=4), and longer chain polymer species, the proportions of which are a direct function of the $P_2O_5$ content of the acid. Although polyphosphoric acids may be referred to in terms of $P_2O_5$ content, polyphosphoric acids are typically referred to in terms of an equivalent $H_3PO_4$ (phosphoric acid) concentration or percentage. Preferably, the polyphosphoric acid used in the preparation of the asphalt paving composition of the present invention has an $H_3PO_4$ equivalent concentration of at least about 100%. More preferably, the polyphosphoric acid has an $H_3PO_4$ equivalent concentration of at least about 105%. Still more preferably, the polyphosphoric acid has an $H_3PO_4$ equivalent concentration of at least about 110%. Even more preferably, the polyphosphoric acid has an $H_3PO_4$ equivalent concentration of at least about 115%. Examples of appropriate polyphosphoric acids include acids having a $H_3PO_4$ equivalent content of 105% ($P_2O_5$ content of about 76.05%), a $H_3PO_4$ equivalent content of 115% ($P_2O_5$ content of about 83.29%), or a $H_3PO_4$ equivalent content of 116.4% ($P_2O_5$ content of about 84.31%), which are commercially available from Astaris LLC.

Polyphosphoric acids are not water-based and are less corrosive than a water-based phosphoric acids, which is advantageous over water-based phosphoric acids. For example, the mixing of phosphoric acid with hot asphalt under typical blending conditions tends to result in foaming and splattering, whereas polyphosphoric acids are readily incorporated with little or no foaming and splattering.

Preferably, the amount of polyphosphoric acid added to the paving composition is an effective amount, that is to say, an amount that increases the adhesion between the asphalt binder and the aggregate compared to an identical paving composition that contains no polyphosphoric acid. More preferably, the polyphosphoric acid is added to the paving composition in an amount that achieves the maximum anti-stripping benefit. Although this optimum amount depends on several factors including the type of asphalt (i.e., the chemical composition of the asphalt), the type of aggregate used to make the paving composition, the moisture content of the asphalt and the aggregate, the inclusion of polymer additives, etc.), it may be readily determined through routine empirical testing. In general, however, it is believed that anti-stripping improvements may be observed by including as little as about 0.05% by weight of polyphosphoric acid in the asphalt binder. Preferably, the concentration of polyphosphoric acid added to the asphalt is at least about 0.1% by weight of the asphalt binder. More preferably, the concentration of polyphosphoric acid added to the asphalt is at least about 0.2% by weight of the asphalt binder.

It has also been discovered that the adhesion may be detrimentally affected by exceeding an upper concentration of polyphosphoric acid. Although this upper concentration level varies on the particular asphalt, it is preferred that the concentration of polyphosphoric acid added to the asphalt be no greater than about 2% by weight of the asphalt binder. More preferably, the concentration of polyphosphoric acid added to the asphalt is no greater than about 1.5% by weight of the asphalt binder. Still more preferably, the maximum concentration of polyphosphoric acid is about 1.2% by weight asphalt binder. Even more preferably, the maximum concentration of polyphosphoric acid is about 1% by weight of the asphalt binder. Still even more preferably, the concentration of polyphosphoric acid added to the asphalt is maximum concentration is about 0.7% by weight asphalt binder.

In view of the foregoing, in one embodiment of the present invention the polyphosphoric acid is at a concentration that is within a range of about 0.05 to about 2.0% by weight of the asphalt binder. Preferably, the polyphosphoric acid is at a concentration that is within a range of about 0.1 and about 1.2% by weight of the asphalt binder. More preferably, the polyphosphoric acid is at a concentration that is within a range of about 0.1 and about 0.7% by weight of the asphalt binder.

C. Alkaline Anti-Stripping Additive

In addition to polyphosphoric acid, the paving composition of the present invention comprises an alkaline anti-stripping additive. It is contemplated that, typically, the alkaline anti-stripping additive would be hydrated lime, which comprises calcium hydroxide ($Ca(OH)_2$). Commercial hydrated lime is a dry powder obtained by treating quicklime (calcium oxide, CaO) with sufficient water to satisfy its chemical affinity for water, thereby converting the oxides to hydroxides.

Preferably, the amount of lime added to the paving composition is an effective amount, that is to say, an amount that increases the adhesion between the asphalt binder and the aggregate compared to an identical paving composition that contains no lime. More preferably, the lime is added to the paving composition in an amount that achieves the maximum anti-stripping benefit. Although this optimum amount depends on several factors including the type of asphalt (i.e., the chemical composition of the asphalt), the type of aggregate used to make the paving composition, the moisture content of the asphalt and the aggregate, the inclusion of polymer additives, etc.), it may be readily determined through routine empirical testing. In general, it is believed that anti-stripping improvements may be observed by including as little lime as about 0.5% by weight of the aggregate in the paving composition. Preferably, the concentration of lime added to the paving composition is at least about 1% by weight of the aggregate. Additionally, it is preferred that the concentration of lime added to the paving composition is not so great as to be a detriment to other properties. Typically, the concentration of lime is no greater than about 2.0% by weight of the aggregate. Preferably, the concentration of lime is no greater than about 1.5% by weight of the aggregate. As such, in one embodiment of the present invention the paving composition comprises lime at a concentration that is between about 0.5 and about 2.0% by weight of the aggregate. Preferably, the paving composition comprises lime at a concentration that is between about 1 and about 1.5% by weight of the aggregate.

When lime is added to hot mix asphalt, it reacts with the aggregate to strengthen the bond between the bitumen and the stone. At the same time that it treats the aggregate, lime also reacts with the asphalt binder. Specifically, it is believed that the lime reacts with highly polar molecules that can otherwise react in the mix to form water-soluble soaps that promote stripping. When those molecules react with lime, they form insoluble salts that no longer attract water (see, e.g., Petersen, J. C., H. Plancher, and P. M. Harnsbergen, "Lime Treatment of Asphalt to Reduce Age Hardening and Improve Flow Properties," Proceedings, AAPT, Vol. 56, 1987). Additionally, the dispersion of the tiny hydrated lime particles throughout the mix makes it stiffer and tougher, reducing the likelihood the bond between the asphalt binder and the aggregate will be broken mechanically, even if water is not present.

The hydrated lime that is used to prepare the paving composition of the present invention may be added to the aggregate, asphalt, or both according to any appropriate method. There are several proven and effective methods for adding hydrated lime to asphalt. Examples of such methods include injecting hydrated lime into a drum mixer, adding the lime in a pug mill, adding dry hydrated lime to moist aggregate with marination, adding slurry lime to aggregate with or without marination (see, e.g., "How to Add Hydrated Lime to Asphalt," An Overview of Current Methods, National Lime Association, http://www.lime.org/publications.html). Typically, the method by which hydrated lime is added is specified by the state departments of transportation. These state-developed specifications and procedures are typically tailored to local materials and the capabilities of construction firms and equipment.

D. Surface-Active Anti-Stripping Additives

Additionally, it has been discovered that the paving composition of the present invention may comprise a surface-active anti-stripping additive. As mentioned above, most of such additives are amine-type additives and this discovery is surprising because amine-type additives are considered by some of skill in the art to be incompatible with phosphoric acid modification. It is important to note that type of surface-active anti-stripping additive that may be included in a paving composition of the present invention is not limited to the amine-type, but also includes, other commercially available surface-active materials that are known by those of skill in the art to increase adhesion between aggregate and asphalt binder.

Typically, amine-type anti-stripping additives comprise, for example, primary amines, diamines, triamines, tetramines, polyamines, amido amines, or ethoxylated diamines, etc. Preferably, a surface-active anti-stripping additive is a liquid so that is more readily mixed throughout the asphalt. Exemplary commercially available liquid amine anti-stripping additives include the PAVEBOND and MORLIFE anti-strips commercially available from Rohm and Haas and the AD-HERE anti-strip available from Arr-Maz Custom Chemicals, Inc.

If included, the concentration of surface-active anti-stripping additive in the paving composition of the present invention is preferably consistent with the concentration(s) considered appropriate for the particular application and the associated variables such as type of asphalt, type of aggregate, etc. Typically, the concentration of surface-active anti-stripping additives is between about 0.5 and about 1.0% by weight of the asphalt binder.

In another embodiment, however, the paving composition of the present invention is preferably not modified with liquid anti-stripping additives, in general, and amine-type anti-strips, in particular. Stated another way, in this embodiment the asphalt binder is preferably substantially free of liquid amine anti-stripping additives. Specifically, the concentration of such additives is, in order of increasing preference, less than about 0.5, 0.2, 0.1, 0.05, or 0.01% by weight of the asphalt binder, or even 0%.

E. Polymer Asphalt Modifiers

The pavement composition of the present invention may also comprise a polymer modifier. Typical polymer asphalt modifiers include styrene-butadiene-styrene copolymers (SBS), styrene-butadiene copolymers (SB), and elastomeric terpolymers. Commercially available terpolymers include ELVALOY available from DuPont, which is an ethylene-glycidyl-acrylate polymer (i.e., it comprises an ethylene backbone modified with a glycidyl functional group to provide epoxy-like reactive properties and an acrylate functional group to provide flexibility and elastomeric properties). Additional appropriate polymer modifiers may include ethylene-vinyl-acetate (EVA) polymers, ethylene-methacrylate (EMA) polymers, styrene-isoprene copolymers (SIS), epoxy resins, natural rubbers, and polydiolefins such as polybutadiene and polyisoprene.

If included, the concentration of polymer modifier in the paving composition of the present invention is preferably consistent with the concentration(s) considered appropriate for the particular application and the associated variables such as type of asphalt, type of aggregate, etc. Typically, the concentration of polymer modifiers is between about 2 and about 10% by weight of the asphalt binder. More typically, the concentration of polymer is between about 2 and about 6% by weight of the asphalt. binder Terpolymers such as the commercially available ELVALOY modifier typically comprise about 2% by weight of the asphalt binder and sometimes as little as about 1% by weight of the asphalt binder.

In another embodiment, however, the paving composition of the present invention is preferably not modified with polymers. Stated another way, in this embodiment the asphalt binder is preferably substantially free of polymer modifiers. Specifically, the concentration of such additives is, in order of increasing preference, less than about 1.0, 0.5, 0.2, 0.1, 0.05, or 0.01% by weight of the asphalt binder, or even 0%.

In view of the foregoing embodiments, the paving composition may also be substantially free of liquid anti-strips and polymer modifiers. Thus, in one embodiment of the present invention the paving composition of present invention may consist essentially of asphalt binder, polyphosphoric acid, lime, and aggregate at the concentrations that are preferably in accordance with the values set forth herein.

F. Preparation of the Asphalt Binder

The preparation of the asphalt binder may be accomplished by any appropriate means known in the art such as direct addition with agitation or in-line mixing. Regardless of the method, the asphalt binder preparation is typically facilitated by increasing the temperature of the asphalt binder, the polyphosphoric acid, and other additives. To facilitate mixing, the temperature is increased to at least the softening point of the asphalt. Typically, the temperature of the mixture is increased to between about 160 and about 200° C. After the asphalt is heated to a temperature sufficient for mixing purposes, the polyphosphoric acid and any other constituents is/are typically introduced into the hot feed of asphalt with agitation adequate to disperse the polyphosphoric acid and other optional constituents throughout the asphalt.

Although asphalt binders that comprise asphalt, additives such as polyphosphoric acid, and polymer modifiers (if present) may be prepared by blending the constituents in-line at the hot mix plant (often referred to as post-blending), it is preferred that the asphalt, polyphosphoric acid, and any optional polymer modifier be blended by the asphalt binder supplier before being delivered to a hot mix asphalt plant (often referred to as pre-blending). Some combinations of asphalt and additives may be mixed relatively easily using a mixing kettle, while others require high shear milling or other special mixing operations. This preference, however, should not be interpreted as an indication that the polyphosphoric acid cannot be mixed with an asphalt binder (free of, or containing a polymer modifier) at a hot mix asphalt facility. In contrast, surface-active anti-stripping additives are typically not pre-blended—they are typically blended with the asphalt at the hot mix facility before the asphalt is mixed with the aggregate. Methods for mixing surface-active anti-stripping additives and asphalt are well known to those of skill in the art and any such method may be used to prepare an asphalt paving composition of the present invention. Likewise, although it may be possible to pre-blend the alkaline anti-stripping additive (e.g., lime) with the asphalt, such a practice would be atypical. As noted above, lime is typically added to the paving composition by treating the aggregate before it is mixed with the asphalt binder.

G. Aggregate

"Aggregate" is a collective term for the mineral materials such as sand, gravel, and crushed stone that are used with an asphalt binder to form compound materials such as a asphalt paving composition. By volume, aggregate typically accounts for at least about 90% by volume of an asphalt paving composition. For example, it is not uncommon for asphalt paving compositions to comprise between about 92 and about 96% by volume of aggregate.

The aggregate may comprise natural aggregate, manufactured aggregate, or a combination of the two. Natural aggregate is typically extracted rock from an open excavation (i.e., a quarry) that is reduced to usable sizes by mechanical crushing. Natural aggregates come from rock from three broad geological classifications: igneous, sedimentary, and metamorphic. Igneous rocks are primarily crystalline that were formed by the cooling of molten material beneath the earth's crust. Sedimentary rocks were formed from deposited insoluble material on the bottom of an ocean or lake that was transformed to rock by heat and pressure. Sedimentary rocks are layered in appearance and are further classified based on the predominant mineral. For example, sedimentary rocks are generally classified as calcareous (limestone, chalk, etc.), siliceous (chert, sandstone, etc.) or argillaceous (shale, etc.). Metamorphic rocks are igneous or sedimentary rocks that have been subjected to enough heat, pressure, or both that their mineral structure has changed from that of the original rock. Manufactured aggregate is typically the byproduct of other manufacturing processes such as slag from metallurgical processing (e.g., steel, tin, and copper production). Manufactured aggregate also includes specialty materials that are produced to have a particular physical characteristic not found in natural rock such as low density. The mineral composition of the aggregate largely determines the physical and chemical characteristics of the aggregate and how it performs as a pavement material. In particular, the composition of the aggregate significantly affects the susceptibility or propensity of a pavement composition to undergo stripping. In fact, the physiochemical surface properties of the aggregate may play a much larger role in stripping of hot mixed asphalt than the properties of the asphalt binder. Although the complex phenomena related to the displacement of the asphalt binder from the surfaces of the aggregate particles by water is not yet fully understood, it is known that the aggregate's chemical composition or mineral content is a significant factor. For example, an aggregate's affinity to water or asphalt plays a role. Some aggregates have an affinity for water over asphalt (hydrophilic), which tends to make them more susceptible to stripping. These aggregates tend to be acidic and examples include quartzite, sandstone, and granite. On the other hand, aggregates with an affinity for asphalt over water (hydrophobic) tend to be less susceptible to stripping. These aggregates tend to be basic and examples include marble, limestone, basalt, and dolomite. The paving composition of the present invention may comprise any appropriate type of paving aggregate. As indicated by the examples below, however, the improvement in adhesion is particularly evident when using aggregate known to be susceptible to stripping such as Lithonia granite.

Thus, aggregate may be selected to improve the anti-stripping property of the paving composition. The selection of aggregate, however, typically is not based solely on its propensity for stripping. Other factors such as hardness, toughness, abrasion resistance, fatigue resistance, cost, availability, etc., are typically considered and may be of greater importance than anti-stripping. For example, although limestone is generally considered to be a good aggregate in terms of anti-stripping, it is considered a poor aggregate in terms of hardness or toughness.

An aggregate is also selected based on the maximum size or mix size of its particles. Examples of mix sizes include 4.75 mm, 9.,5 mm, 12.5 mm, 19.0 mm, 25.0 mm, and 37.5 mm. In addition to mix size, gradation (i.e., the relative amounts of different sized particles, which is typically determined by sieve analysis) tends to be a selection factor.

Examples of typical gradations include: dense or well-graded, which is the most widely used in the U.S.; gap graded, which tends to be prone to segregation during placement of the paving composition; open graded, which may result in a greater percentage of voids because there are not enough small particles in between larger particles; and uniformly graded in which all the particles are essentially the same size.

The selection of an appropriate aggregate type and its properties (e.g., mix size, gradation, moisture content, etc.) for a particular application is based on many factors such as pavement location, traffic type, temperature, etc. and is known and understood by those of skill in the art.

H. Method of Preparing an Asphalt Paving Composition

Because it is generally understood by those of skill in the art that the extent of enhancement or detriment to properties such as anti-stripping and other properties such as rutting, stiffness, abrasion resistance, oxidation and aging, and cracking depend in large part on numerous variables such as the type(s) of asphalt(s), type(s) of aggregate(s), asphalt modification parameters including the temperature, time, type(s) and concentration(s) of modifying agents, an empirical determination of the optimum materials, concentrations, processing conditions, or combinations thereof is preferred to produce an asphalt concrete having the highest degree of anti-stripping behavior along other acceptable properties.

In general, an acceptable asphalt paving composition may be prepared by mixing the asphalt binder, typically modified with the polyphosphoric acid and any other modifiers, and the aggregate, typically treated with lime, at an elevated temperature (e.g., greater than about 165° C.) for a duration to coat the aggregate (e.g., between about 1 and about 4 hours) according any method known in the art. Common methods include batch preparation, the parallel-flow drum-mix, and the counter-flow drum mix. Although different methods may be used to combine the aggregate with the asphalt binder, the resulting paving composition is essentially the same—aggregate and binder in an amount sufficient to coat the aggregate and adequately bind the paving composition. Typically, the amount of asphalt binder is at least about 4% by weight with the remainder of the paving composition comprising the aggregate, which is preferably treated with lime. Additionally, the paving composition typically does not comprise more than about 7% by weight of the asphalt binder because, among other things, it becomes significantly more costly and typically more prone to deformation. In view of this, the concentration of asphalt binder in the paving composition is preferably between about 4 and about 7% by weight. More preferably, the concentration asphalt binder is between about 4.5 and about 6.5% by weight.

I. Use of an Asphalt Paving Composition

It is important to note that although the addition of phosphoric acid and lime may be used to improve the adhesion between the asphalt and the aggregate, other factors related to how a paving composition is applied play a significant role in the durability of a pavement. For example, it is well known by those of skill in the art that the thickness of the pavement ("lift thickness") and the degree of compaction, often measured as void percentage, affect the permeability of the pavement to water. In general, it is believed that that lift thickness should be between three and about four times that of the aggregate mix size. For example, the preferred lift size for a paving composition containing a 9.5 mm mix size is about 38 mm (about 1.5 inches). The proper mix selection and the lift thickness aids the compaction of the paving composition thereby reducing permeability. Preferably, the compaction of the paving composition is to a void percentage that is less than about 7.5%. Typically, the compaction may be such that a void percentage as low as about 4-5% may be attained.

EXAMPLE 1

Evaluation of Moisture Sensitivity using the Texas Boil Test

The Texas Boil Test (Texas Method Tex-530-C) or ASTM D 3625, "Effect of Water on Bituminous-Coated Aggregate Using Boiling Water", is a subjective test that is widely used in the asphalt binder industry to assess the adherence of an asphalt binder to a particular aggregate. In this test the asphalt binder is mixed with the aggregate and the temperature of the mixture is increased to about 135° C. Upon reaching about 135° C., the mixture is poured into a container (e.g., a beaker) of boiling water and the contents are boiled for about ten minutes. The asphalt binder is then separated from the water and allowed to dry at room temperature. The dried asphalt is evaluated by visually estimating the percentage of aggregate that is covered with adhering asphalt binder. Typically, a control sample of asphalt concrete (i.e., a concrete without an anti-stripping additives) is simultaneously tested to more accurately evaluate the effectiveness of the additive(s).

These tests were performed to evaluate the effect on stripping that different concentrations of 105% polyphosphoric acid would have on three asphalts with significantly different chemistries. Also evaluated was the effect of two liquid amine anti-stripping additives and lime in conjunction with the polyphosphoric acid. The two liquid amine anti-stripping additives were PAVEBOND (light grade) available from Rohm & Haas and ADHERE (HP plus) available from Arr-Maz Custom Chemicals, Inc. The aggregate was 9.5 mm Lithonia granite available from Martin Marietta. This aggregate was selected because it is known to be particularly susceptible to stripping. The selected asphalts were a PG 64-22 from Valero/UDS, a PG 67-22 available from Citgo, and a PG 58-22 available from Husky.

The concentrations of the constituents and the results of the Texas Boil Test are set forth in Table A below.

TABLE A

| | | | | | Estimated, % Adhesion | |
|---|---|---|---|---|---|---|
| Asphalt | Polyphosphoric Acid[1] | PAVEBOND LITE[1] | Adhere HP Plus[1] | Lime[2] | Unaged | Aged 1 Week @ 120° F. |
| Valero PG 64-22 | | | 0.5 | | 99 | 100 |
| | 0.5 | | | | 98 | 99 |

TABLE A-continued

| Asphalt | Polyphosphoric Acid[1] | PAVEBOND LITE[1] | Adhere HP Plus[1] | Lime[2] | Unaged | Aged 1 Week @ 120° F. |
|---|---|---|---|---|---|---|
| | 0.5 | 0.5 | | | 92 | 98 |
| | 0.5 | | | 2.0 | 85 | 95 |
| | 2.0 | | | 2.0 | 82 | 88 |
| | 2.0 | 0.5 | | | 80 | 90 |
| | 0.5 | | 0.5 | | 80 | 88 |
| | 2.0 | | 0.5 | | 75 | 88 |
| | | | | 2.0 | 58 | 87 |
| | 0.5 | | | | 20 | 85 |
| | 2.0 | | | | 10 | 60 |
| | Neat Asphalt (Control) | | | | 2 | 2 |
| Citgo PG 67-22 | 0.5 | | | 2.0 | 92 | 98 |
| | 0.5 | | 0.5 | | 90 | 98 |
| | | | 0.5 | | 89 | 96 |
| | 0.5 | 0.5 | | | 85 | 88 |
| | 2.0 | | | 2.0 | 85 | 88 |
| | | 0.5 | | | 77 | 93 |
| | | | | 2.0 | 75 | 90 |
| | 2.0 | | 0.5 | | 60 | 60 |
| | 0.5 | | | | 55 | 75 |
| | 2.0 | 0.5 | | | 55 | 60 |
| | 2.0 | | | | 13 | 55 |
| | Neat Asphalt (Control) | | | | 2 | 4 |
| Husky PG 58-22 | 0.5 | | | 2.0 | 94 | 98 |
| | 0.5 | 0.5 | | | 94 | 92 |
| | | | 0.5 | | 92 | 9 |
| | 0.5 | | 0.5 | | 92 | 96 |
| | 2.0 | | | 2.0 | 87 | 92 |
| | | | | 2.0 | 83 | 88 |
| | | 0.5 | | | 80 | 85 |
| | 0.5 | | | | 77 | 82 |
| | 2.0 | | 0.5 | | 74 | 75 |
| | 2.0 | 0.5 | | | 60 | 65 |
| | 2.0 | | | | 13 | 50 |
| | Neat Asphalt (Control) | | | | 12 | 10 |

[1]Added directly to asphalts.
[2]Pre-blended with aggregate prior to hot mixed asphalt properties.

The foregoing data indicates the following unexpected results. First, the combination of about 0.5% polyphosphoric acid and about 2.0% lime-treated aggregate exhibited the best overall anti-stripping properties. Second, the data indicates that the paving compositions that comprised about 0.5% polyphosphoric acid with and without 0.5% of a liquid anti-strip additive had similar degrees of adhesion. Third, high concentrations of polyphosphoric acid, by itself, do not improve adhesion. As such, it is believed that exceeding a certain concentration of polyphosphoric (e.g., about 2.0%), with lime or liquid anti-strip additives, decreases the adhesion of the asphalt binder to the aggregate. Fourth, the control (untreated) asphalt exhibited the worst adhesion. Fifth, aging the pavement composition (i.e., maintaining it at about 49° C. for about one week) improved the anti-stripping nature of the pavement composition. Lastly, including about 0.5% polyphosphoric acid in the asphalt binder seemed to have an equivalent effect as adding 2.0% lime to the aggregate. In summary, the an improvement in adhesion is realized by selecting concentrations of polyphosphoric acid and lime within readily determinable ranges.

EXAMPLE 2

Rheological Evaluation with the Dynamic Shear Rheometer

Several of the asphalt binders set forth in Example 1 were tested according to the standard dynamic shear rheometer test (AASHTO TP 5). The test involves measuring the complex shear modulus ($G^*$) and the phase angle ($\delta$), which is the time lag expressed in radians between the maximum applied shear stress and the maximum resulting shear strain. The complex shear modulus ($G^*$) and the phase angle ($\delta$) are used as predictors for rutting and fatigue cracking. To resist rutting, an asphalt binder should be stiff (not deform too much) and it should be elastic (able to return to its original shape after load deformation), which corresponds to a large elastic portion of the complex shear modulus ($G^*\cos\delta$). Intuitively, the higher the $G^*$ value, the stiffer the asphalt binder is (resistant to deformation), and the lower the $\delta$ value, the greater the elastic portion of $G^*$ is (ability to rebound to its original shape). To resist fatigue cracking, an asphalt binder should be elastic and not too stiff (excessively stiff substances will crack rather than deform and rebound). The viscous portion of the complex shear modulus ($G^*\sin\delta$) is preferably small. Although they appear similar, specifying a large $G^*\cos\delta$ and a small $G^*\sin\delta$ are not the same. They both typically require small phase angles ($\delta$), but the key is having a complex shear modulus ($G^*$) that is neither too large or too small.

The concentrations of the constituents and the results of the dynamic shear rheometer testing are set forth in Table B below.

TABLE B

| % Addition | | | | DSR, G*/sin δ, Original | DSR, G*/sin δ, Original | DSR, G*/sin δ, Original |
|---|---|---|---|---|---|---|
| Polyphosphoric Acid[1] | PAVEBOND LITE | Adhere HP Plus[1] | Lime[2] | Sample 64° C.; kPa Valero PG 64-22 | Sample 67° C.; kPa Citgo PG 67-22 | Sample 58° C.; kPa Husky PG 58-22 |
| 0.5 | | | | 1.830 | 2.444 | 2.740 |
| 0.5 | | | 2.0 | n/a[3] | n/a[3] | n/a[3] |
| 0.5 | 0.5 | | | 1.294 | 1.470 | 1.908 |
| 0.5 | | 0.5 | | 1.426 | 1.499 | 2.222 |
| 2.0 | | | | 7.836 | 12.47 | 8.278 |
| 2.0 | | | 2.0 | n/a[3] | n/a[3] | n/a[3] |
| 2.0 | 0.5 | | | 2.710 | 4.331 | 3.966 |
| 2.0 | | 0.5 | | 2.528 | 3.632 | 3.498 |
| | 0.5 | | | 1.192 | 1.584 | 1.863 |
| | | 0.5 | | 1.246 | 1.405 | 2.119 |
| | | | 2.0 | n/a[3] | n/a[3] | n/a[3] |
| Neat Asphalt (Control) | | | | 1.377 | 1.478 | 1.706 |

[1] Added directly to asphalts.
[2] Pre-blended with aggregate.
[3] DSR value of "modified" binder equivalent to binder without lime.

Among other things, the foregoing data indicates that the addition of 0.5% of a liquid amine anti-strip additive (an ether amine) produced mixed results on the viscous portion of the complex shear modulus (G*sin δ). Specifically, for the PG 64-22 asphalt, the G*sin δ was decreased by adding the liquid amine additives, with the PAVEBOND additive providing a larger decrease. For the PG 67-22 asphalt, the PAVEBOND increased the G*sin δ and the ADHERE decreased the G*sin δ. For the PG 58-22 asphalt, both additives increased the G*sin δ, but the ADHERE provided a greater increase. Further, a significant increase to the G*sin δ was observed by the addition of 0.5% polyphosphoric acid without a liquid amine additive. In fact, the increase was large enough to raise the high temperature grade of the binder. Additionally, the G*sin δ results from combining 0.5% polyphosphoric acid and liquid amine additives were mixed. Specifically, they were neutral for the PG 64-22 and PG 67-22 asphalts and significantly increased for the PG 58-22 asphalt. Still further, the addition of 2.0% polyphosphoric acid, with and without liquid amine additives, significantly increased the G*sin δ.

EXAMPLE 3

Evaluation of Moisture Sensitivity using the Lottman Procedure

The Lottman Procedure, which is also known according to the AASHTO designation T 283-89(1993) and is entitled "Resistance of Compacted Bituminous Mixture-Induced Damage", is performed to measure the effects of saturation and accelerated water conditioning on the diametral tensile strength of compacted bituminous mixtures. The samples were prepared using about 6.4% asphalt binder. The results of the Lottman Procedure may be used to predict long-term stripping susceptibility of said mixtures and to evaluate the effectiveness of anti-stripping additives that may be added to an asphalt binder or an aggregate.

The tensile strengths compacted samples are typically tested before and after being conditioned. Typically, three samples are used for each test. The water conditioning process comprises vacuum saturating them with moisture, maintaining the samples at about 60° C. for about 24 hours, and then placing the samples in a water bath that is at about 25° C. for about two hours. Additionally, a freeze-thaw cycle may be added to the conditioning process. The tensile strengths of the unconditioned and conditioned samples are determined. Generally, if the tensile strengths of the conditioned samples are at least about 70 percent of the unconditioned samples the particular asphalt binder is considered to be resistant to moisture induced damage. The different sample compositions and test results are set forth in Table C below.

TABLE C

| Binder, Citgo PG 67-22 | Lottman Results, psi | | | | | | | | % TSR |
|---|---|---|---|---|---|---|---|---|---|
| | Unconditioned, Replicate # | | | | Conditioned, Replicate # | | | | |
| w/Treatment Noted | 1 | 2 | 3 | Avg | 1 | 2 | 3 | Avg | (Cond/Uncond) |
| control (no additive) | 145.6 | 144.5 | 140.1 | 143.4 | 63.8 | 61.0 | 67.0 | 63.9 | 44.6 |
| 0.5% PPA + 2.0% Lime | 167.6 | 163.8 | 160.8 | 164.1 | 160.3 | 161.3 | 162.2 | 161.3 | 98.3 |
| 0.5% PPA + PAVEBOND LITE | 142.8 | 135.5 | 138.3 | 138.9 | 133.4 | 133.3 | 127.4 | 131.4 | 94.6 |
| 2.0% Lime | 173.6 | 168.3 | 164.1 | 168.7 | 157.9 | 151.9 | 154.7 | 154.8 | 91.8 |
| 0.5% PPA (105%) | 149.0 | 148.6 | 149.1 | 148.3 | 135.8 | 143.7 | 141.9 | 140.5 | 94.7 |
| 0.5% PPA (115%) | 159.4 | 166.4 | 166.7 | 164.1 | 156.4 | 147.9 | 155.6 | 153.3 | 93.4 |
| 0.5% PAVEBOND LITE | 158.9 | 161.6 | 156.9 | 159.1 | 160.2 | 155.6 | 160.4 | 158.7 | 99.7 |

Note:
aggregate source was Lithonia Granite (Martin Marietta); Mix Design GA DOT 9.5 mm Marshall Design w/6.4% AC.

The data in Table C is consistent with some generally known trends such as the understanding that amine anti-strips tend to reduce the viscosity of an asphalt binder and are expected to decrease the strength of a paving composition. It is also generally known that lime, alone, and polyphosphoric acid, alone, tend to increase the viscosity of an asphalt binder and are expected to increase the strength of a paving composition. Unexpectedly, however, the combination of polyphosphoric acid and lime provided the greatest strength increase. Also unexpectedly, the combination of amine anti-strip and polyphosphoric acid had a strength that was significantly less than the other modified samples.

EXAMPLE 4

Hamburg Wheel Test

In this procedure, specimens comprising an asphalt binder and aggregate are prepared in the form of compacted slabs that are mounted and placed in temperature controlled water bath (e.g., 50-60° C.). The slabs are compacted using a linear kneading compactor that achieves the desired density without fracturing aggregate. The prepared samples are placed in the device and the wheels are set in motion and data recording starts. This data, which may be collected automatically per wheel pass, includes rut depth and bath temperature. Often this test is performed until 20,000 cycles or 20 mm of deformation, whichever is reached first. For this evaluation, however, the test was performed for 8,000 cycles and the rut depth was determined. A 10 mm rut depth was the criteria to determine if a sample passed or failed. These parameters are currently in use by several state Departments of Transportation because they provide a quicker and more cost effective evaluation. It is to be noted that a test failure does not necessarily mean that such a paving composition would actually fail if used in the field. The results of the test are merely a method of predicting a paving composition's resistance to rutting and stripping under extreme conditions of moisture exposure and evaluating relative performance of different paving compositions.

The asphalt binder compositions and their dynamic shear rheometer data are set forth in Table D below.

TABLE D

| Ingredient | Trial/Blend #; Wt % | | | | | | | |
|---|---|---|---|---|---|---|---|---|
| | -01 | -02 | -03 | -04 | -05 | -06 | -07 | -08 |
| Citgo, PG 67-22; 1/04 | 100.0 | 99.5 | 99.0 | 100.0 | 99.5 | 99.5 | 99.5 | 99.5 |
| PPA, 105% (1/04) | — | — | — | — | 0.5 | — | — | 0.5 |
| PPA, 115% (1/04) | — | 0.5 | 0.5 | — | — | 0.5 | — | — |
| PAVEBOND LITE (9/03) | — | — | 0.5 | — | — | — | 0.5 | — |
| Binder Data/Properties: Original - As Blended | | | | | | | | |
| DSR, G*/Sin δ, 67° C. kPa | 1.498 | 2.949 | 1.576 | 1.511 | 3.139 | 2.856 | 1.682 | 3.139 |
| Phase Angle, * | 84.2 | 75.9 | 83.9 | 84.8 | 76.9 | 77.0 | 84.2 | 76.9 |
| Softening Point, ° C. | 124.0 | 138.0 | 130.3 | 123.0 | 134.8 | 137.8 | 132.5 | 134.8 |
| RTFOT Residue: | | | | | | | | |
| Mass Loss, % | 0.284 | 0.257 | 0.329 | 0.312 | 0.343 | 0.368 | 0.427 | 0.43 |
| DSR, G*/Sin δ, 67° C. kPa | 3.753 | 7.548 | 3.422 | 3.541 | 8.676 | 7.386 | 3.881 | 8.676 |
| Phase Angle, * | 79.6 | 68.9 | 79.1 | 79.5 | 68.5 | 69.0 | 78.8 | 68.5 |
| Lime-Added to Aggregate prior to mixing w/binder | | | | | | | | |
| Lime-Added to Aggregate, % | — | 2.0 | — | 2.0 | — | — | — | — |

The data in Table D is consistent with the data of the other examples and demonstrates the Theological effects induced by the polyphosphoric acid and the other additives at relatively small concentrations. It was expected that there would be an indirect correlation of rut depth to complex shear modulus (G*). Specifically, it was expected that at greater the G* values the rut depth would be reduced.

The pavement compositions, which were made with the asphalt binders set forth in Table D, and the Hamburg Test results are set forth in Table E below. The initial evaluations were directed to establishing a test temperature that would result in the control (a neat or untreated asphalt binder mixed with the Lithonia granite aggregate) failing and a sample that comprised a neat asphalt binder and lime treated Lithonia granite aggregate passing. The temperature that differentiated the samples was about 50° C. In addition to the rut depth measurement, each of the samples was visually inspected to determine the percent of stripping caused by the testing.

mined that the combination of polyphosphoric acid modified asphalt binder and lime treated aggregate provided the best overall results (i.e., the second smallest rut depth and the less than about 5% stripping). Additionally, there did not seem to be a significant performance difference between the 105% and the 115% phosphoric acids. It was also observed that the relatively high concentration of asphalt binder (i.e., about 6.5%) produced a rut depth resulting in failure.

All references cited in this specification, including without limitation all journal articles, brochures, manuals, periodicals, texts, manuscripts, website publications, and any and all other publications, are hereby incorporated by reference. The discussion of the references herein is intended merely to summarize the assertions made by their authors and no admission is made that any reference constitutes prior art. Applicants reserve the right to challenge the accuracy and pertinence of the cited references.

It is to be understood that the above description is intended to be illustrative and not restrictive. Many embodi-

TABLE E

| Data/Information | Trial/Blend #; Wt % | | | | | | | |
|---|---|---|---|---|---|---|---|---|
| | −01 M | −02 M | −03 M | −04 M | −05 M | −06 M | −07 M | −08 M[1] |
| # Specimens Prepared | 5-6 | 2 | 2 | 5-6 | 2 | 2 | 2 | 2 |
| Specimen Height | 63.1, 64.0 | 62.5, 62.5 | 62.5, 62.5 | 63.5, 63.5 | 62.5, 62.5 | 62.5, 62.5 | 62.5, 62.5 | 62.5, 62.5 |
| Specimen Weight, grams | 2550, 2561 | 2510, 2512 | 2505, 2510 | 2559, 2567 | 2503, 2506 | 2506, 2509 | 2507, 2508 | 2428, 2435 |
| Air Voids | 6.2, 7.1 | 7.0, 6.8 | 7.0, 6.9 | 6.6, 6.5 | 7.2, 7.1 | 7.0, 6.9 | 7.0, 6.9 | 6.5, 6.3 |
| Density | 144.3, 142.9 | 143.1, 143.5 | 143.1, 143.2 | 143.7, 143.9 | 142.8, 143.0 | 143.1, 143.2 | 143.1, 143.2 | 140.0, 140.2 |
| Binder Content, % | 4.5 | 4.5 | 4.5 | 4.5 | 4.5 | 4.5 | 4.5 | 6.5 |
| Superpave Compaction Parameters Used | | | | | | | | |
| Mix Temperature, ° C. (° F.) | 165 | 173 | 167 | 165 | 173 | 173 | 165 | 173 |
| Compaction Temperature, ° C. (° F.) | 155 | 162 | 156 | 155 | 162 | 162 | 155 | 162 |
| Hamburg-Wet Test Data | | | | | | | | |
| Specimen Height | 63.1, 64.0 | 62.5, 62.5 | 62.5, 62.5 | 63.5, 63.5 | 62.5, 62.5 | 62.5, 62.5 | 62.5, 62.5 | 62.5, 62.5 |
| Specimen Weight, grams | 2550, 2561 | 2510, 2512 | 2505, 2510 | 2559, 2567 | 2503, 2506 | 2506, 2509 | 2507, 2508 | 2428, 2435 |
| Test Temperature Selected, ° C. | 50 | 50 | 50 | 50 | 50 | 50 | 50 | 50 |
| Rut Depth, mm @ 1,000 | 1.894 | 1.246 | 1.949 | 2.595 | 0.840 | 1.923 | 1.578 | 2.871 |
| 2,000 | 3.218 | 1.537 | 2.773 | 2.829 | 1.114 | 2.514 | 2.209 | 4.205 |
| 3,000 | 4.017 | 1.847 | 3.526 | 3.307 | 1.440 | 2.865 | 2.595 | 5.304 |
| 4,000 | 5.259 | 2.274 | 3.704 | 3.297 | 1.766 | 3.363 | 2.748 | 6.638 |
| 5,000 | 7.133 | 2.493 | 3.786 | 3.668 | 2.086 | 3.730 | 3.175 | 8.598 |
| 6,000 | 9.378 | 2.646 | 3.964 | 3.831 | 2.427 | 4.014 | 3.394 | 11.08 |
| 7,000 | 11.40 Fail | 3.017 | 4.432 | 3.857 | 2.783 | 4.325 | 3.588 | 11.83 Fail |
| 8,000 | — | 3.226 | 4.539 | 4.014 | 3.124 | 4.559 | 3.735 | — |
| Status | fail | pass | pass | pass | pass | pass | pass | fail |
| Stripping, % (by observation) | 80 | ≦5 | ≦5 | ≦5 | 15 | ≦5 | ≦5 | 40 |

[1]Trial −08 M is the same as −05 M, but the concentration of asphalt binder in the paving composition was 6.5%.

Among other things, the data in Table E generally indicates that the addition of polyphosphoric acid has a significant effect on the potential performance of a paving composition. Another general observation was that there was some correlation between the rut depth and the degree of stripping. Further, it appears that resistance to deformation may be more complex than simply being related to the complex shear modulus. More specifically, it was determents will be apparent to those of skill in the art upon reading the above description. The scope of the invention should therefore be determined not with reference to the above description alone, but should be determined with reference to the claims and the full scope of equivalents to which such claims are entitled.

When introducing elements of the present invention or an embodiment thereof, the articles "a", "an", "the" and "said"

are intended to mean that there are one or more of the elements. The terms "comprising", "including" and "having" are intended to be inclusive and mean that there may be additional elements other than the listed elements. Additionally, it is to be understood an embodiment that "consists essentially of" or "consists of" specified constituents may also contain reaction products of said constituents.

The recitation of numerical ranges by endpoints includes all numbers subsumed within that range. For example, a range described as being between 1 and 5 includes 1, 1.6, 2, 2.8, 3, 3.2, 4, 4.75, and 5.

What is claimed is:

1. An asphalt paving composition comprising an asphalt binder, aggregate, and an alkaline anti-stripping additive, wherein the asphalt binder comprises asphalt and polyphosphoric acid.

2. The asphalt paving composition of claim 1 wherein the asphalt binder is at a concentration that is between about 4 and about 7% by weight of the asphalt paving composition.

3. The asphalt paving composition of claim 1 wherein the aggregate is at a concentration that is at least about 90% by volume of the asphalt paving composition.

4. The asphalt paving composition of claim 1 wherein the polyphosphoric acid is at a concentration that is at least about 0.05% by weight of the asphalt binder.

5. The asphalt paving composition of claim 1 wherein the concentration of the polyphosphoric acid is no greater than about 2.0% by weight of the asphalt binder.

6. The asphalt paving composition of claim 1 wherein the alkaline anti-stripping additive comprises calcium hydroxide.

7. The asphalt paving composition of claim 1 wherein the alkaline anti-stripping additive is at a concentration that is at least about 0.5% by weight of the aggregate.

8. The asphalt paving composition of claim 7 wherein the concentration of the alkaline anti-stripping additive is no greater than about 2% by weight of the aggregate.

9. The asphalt paving composition of claim 1 wherein the asphalt binder further comprises a surface-active anti-stripping additive.

10. The asphalt paving composition of claim 9 wherein the surface-active anti-stripping additive comprises an amine.

11. The asphalt paving composition of claim 9 wherein the surface-active anti-stripping additive is at a concentration that is between about 0.5 and about 1.0% by weight of the asphalt binder.

12. The asphalt paving composition of claim 1 wherein the asphalt binder further comprises a polymer modifier.

13. The asphalt paving composition of claim 12 wherein the polymer modifier is selected from the group consisting of a styrene-butadiene-styrene copolymer, a styrene-butadiene copolymer, a terpolymer, an ethylene-vinyl-acetate polymer, an ethylene-methacrylate polymer, a styrene-isoprene copolymer, an epoxy resin, a natural rubber, a polydiolefin, and combinations thereof.

14. The asphalt paving composition of claim 12 wherein the polymer modifier is at a concentration that is at least about 1.0% by weight of the asphalt binder.

15. The asphalt paving composition of claim 12 wherein the concentration of the polymer modifier is no greater than about 10.0% by weight of the asphalt binder.

16. The asphalt paving composition of claim 1 consisting essentially of the asphalt, the aggregate, the polyphosphoric acid, and the alkaline anti-stripping additive.

17. A method for improving the resistance to stripping of an asphalt pavement prepared using an asphalt paving composition that comprises asphalt and aggregate, the method comprising modifying the asphalt paving composition by adding polyphosphoric acid and an alkaline anti-stripping additive to the asphalt paving composition.

18. A method for preparing an asphalt paving composition, the method comprising mixing a modified asphalt binder that comprises an asphalt and polyphosphoric acid with aggregate and an alkaline anti-stripping additive to produce the asphalt paving composition.

19. The method of claim 18 wherein the modified asphalt binder is at a concentration that is between about 4 and about 7% by weight of the asphalt paving composition, the aggregate is at a concentration that is at least about 90% by volume of the asphalt paving composition, the polyphosphoric acid has an $H_3PO_4$ equivalent concentration of at least about 100% and is at a concentration that is between about 0.05% and about 2.0% by weight of the modified asphalt binder, and the alkaline anti-stripping additive is at a concentration that is between about 0.5 and about 2.0% by weight of the aggregate.

20. The method of claim 18 wherein the modified asphalt binder consists essentially of asphalt and polyphosphoric acid.

* * * * *

(12) INTER PARTES REEXAMINATION CERTIFICATE (1025th)
United States Patent
Falkiewicz

(10) Number: US 7,309,390 C1
(45) Certificate Issued: Jan. 9, 2015

(54) STRIP-RESISTANT ASPHALT PAVING COMPOSITION AND METHOD FOR MAKING THE SAME

(75) Inventor: Michael Falkiewicz, St. Charles, MO (US)

(73) Assignee: ICL Performance Products LP, St. Louis, MO (US)

Reexamination Request:
No. 95/002,151, Sep. 7, 2012

Reexamination Certificate for:
Patent No.: 7,309,390
Issued: Dec. 18, 2007
Appl. No.: 11/154,241
Filed: Jun. 16, 2005

Related U.S. Application Data

(60) Provisional application No. 60/582,118, filed on Jun. 23, 2004.

(51) Int. Cl.
*C09D 195/00* (2006.01)
*C08L 95/00* (2006.01)
*C08K 3/32* (2006.01)
*C08L 7/00* (2006.01)
*C08L 23/00* (2006.01)
*C08L 63/00* (2006.01)

(52) U.S. Cl.
CPC . *C08L 95/00* (2013.01); *C08K 3/32* (2013.01); *C08L 7/00* (2013.01); *C08L 23/00* (2013.01); *C08L 63/00* (2013.01); *C08L 2666/74* (2013.01)
USPC .................................. 106/284.04; 106/284.1

(58) Field of Classification Search
None
See application file for complete search history.

(56) References Cited

To view the complete listing of prior art documents cited during the proceeding for Reexamination Control Number 95/002,151, please refer to the USPTO's public Patent Application Information Retrieval (PAIR) system under the Display References tab.

*Primary Examiner* — Norca L Torres Velazquez

(57) ABSTRACT

The present invention is directed to a stripping-resistant asphalt paving composition that contains asphalt, aggregate, polyphosphoric acid, and an alkaline anti-stripping additive.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-20 are cancelled.

\* \* \* \* \*